United States Patent
Kothinti Naresh

(10) Patent No.: US 11,620,133 B2
(45) Date of Patent: Apr. 4, 2023

(54) REDUCTION OF DATA CACHE ACCESS IN A PROCESSING SYSTEM

(71) Applicant: QUALCOMM Incorporated, San Diego, CA (US)

(72) Inventor: Vignyan Reddy Kothinti Naresh, Morrisville, NC (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/368,536

(22) Filed: Mar. 28, 2019

(65) Prior Publication Data

US 2020/0310814 A1 Oct. 1, 2020

(51) Int. Cl.
G06F 9/30 (2018.01)
G06F 9/38 (2018.01)
G06F 9/48 (2006.01)

(52) U.S. Cl.
CPC ........ G06F 9/3836 (2013.01); G06F 9/30043 (2013.01); G06F 9/3824 (2013.01); G06F 9/4881 (2013.01)

(58) Field of Classification Search
CPC .. G06F 9/3836; G06F 9/30043; G06F 9/4881; G06F 9/3824; G06F 9/3834
See application file for complete search history.

(56) References Cited

U.S. PATENT DOCUMENTS

| | | | |
|---|---|---|---|
| 6,868,491 B1 | 3/2005 | Moore | |
| 6,976,147 B1 | 12/2005 | Isaac et al. | |
| 7,383,543 B2 * | 6/2008 | Wu | G06F 9/383 |
| | | | 712/E9.047 |
| 9,400,752 B1 | 7/2016 | Alexander et al. | |
| 9,594,566 B1 | 3/2017 | Alexander et al. | |
| 9,928,075 B2 * | 3/2018 | Alexander | G06F 9/30043 |
| 10,437,595 B1 | 10/2019 | Kanapathipillai et al. | |
| 2005/0188184 A1 | 8/2005 | Senter et al. | |

(Continued)

FOREIGN PATENT DOCUMENTS

EP 2336878 A1 6/2011

OTHER PUBLICATIONS

Nicolaescu et al.; Reducing Data Cache Energy Consumption via Cached Load/Store Queue; ISLPED '03; Aug. 2003; ACM.*

(Continued)

*Primary Examiner* — Corey S Faherty
(74) *Attorney, Agent, or Firm* — Edward J. Meisarosh

(57) ABSTRACT

Systems and methods for reusing load instructions by a processor without accessing a data cache include a load store execution unit (LSU) of the processor, the LSU being configured to determine if a prior execution of a first load instruction loaded data from a first cache line of the data cache and determine if a current execution of the second load instruction will load the data from the first cache line of the data cache. Further, the LSU also determines if a reuse of the data from the prior execution of the first load instruction for the current execution of the second load instruction will lead to functional errors. If there are no functional errors, the data from the prior execution of the first load instruction is reused for the current execution of the second load instruction, without accessing the data cache for the current execution of the second load instruction.

17 Claims, 7 Drawing Sheets

(56) References Cited

U.S. PATENT DOCUMENTS

2014/0173294 A1    6/2014  Buer

OTHER PUBLICATIONS

Al-Zawawi A.S., et al., "Transparent Control Independence (TCI)", ISCA'07, Jun. 9-13, 2007, ACM, 2007, 12 pages.
Sodani A., et al., "Dynamic Instruction Reuse", ACM 1997, ISCA '97 Denver, CO, USA, 1997, pp. 194-205.
International Search Report and Written Opinion—PCT/US2020/024729—ISA/EPO—dated Jul. 21, 2020.

* cited by examiner

| Load-identifier (M bits) | Cache line tag (N bits) | Unaligned (1 bit) | Valid (1 bit) |
|---|---|---|---|
| ⋮ | ⋮ | ⋮ | ⋮ |

Reuse Load Queue (RLQ)

FIG. 4

REDUCTION OF DATA CACHE ACCESS IN A PROCESSING SYSTEM

FIELD OF DISCLOSURE

Disclosed aspects are directed to reducing latency and power consumption of cache accesses in processing systems. More specifically, exemplary aspects are directed to the identification of unchanged load instructions in a data cache, for reducing accesses to the data cache for the unchanged load instructions.

BACKGROUND

In processing systems, load instructions are used for loading information such as instructions and data from one or more memory structures, e.g., for their subsequent use in a processor. Execution of the load instructions may involve expensive processes in terms of latency and power consumption. This is because the information to be loaded to service the load instruction may be available in a memory structure which is located at a distance from the requesting processor. While the load instruction is being executed, other instructions in a dependency chain of the load instruction may be stalled.

In modem processing systems, load instructions may first access one or more cache levels before proceeding to a main memory or backing storage for retrieving the information to be loaded, which may incur high energy consumption. Further, with prediction based speculative execution and out-of-order processing of instructions, a load instruction may be subjected to one or more checks for ensuring functional correctness in accordance with specifications of the processing systems.

For instance, a load instruction may be incorrectly executed based on an incorrect speculation, e.g., the load instruction may be in a wrong-path of a mispredicted branch instruction, the load instruction might have been executed earlier than a conflicting store instruction, the load instruction may cause a deadlock when all the load queue entries are taken up by the younger load instructions that executed speculatively, etc. When it is discovered that a load instruction has been incorrectly executed, the load instruction may be executed again, and additional checks may be in place to ensure functional correctness.

In some cases, execution of a load instruction may be repeated to avoid data hazards. For example, memoized structures may be used for storing results of some instruction streams, wherein results of some operations, such as function calls or outputs of a known set of inputs for a particular operation, are stored or cached for reuse. A memoized structure may include stored results of some load instructions, for reuse. However, to ensure functional correctness, additional checks (or sometimes re-execution of the load instruction, e.g., in a multi-core environment) may be incurred even when the result of the load instruction can be obtained from the memoization structure.

In the above-discussed examples, re-executing a load instruction may incur many of the functional checks and other expenses that a typical first-time execution or prior execution of the same load instruction may have incurred. One such expense relates to a data cache access for a load instruction which attempts to load data from the data cache. In conventional implementations, re-execution of a load instruction may also involve a data cache access. In addition to the energy expense of accessing the data cache, an evaluation load instruction (i.e., a load instruction which executes only to evaluate its own predication) may consume an access port, which may deny the chance for another non-evaluation-load to execute in that cycle. In a typical computing system, an execution unit may have a dedicated register file (RF). The RF typically is a hardware device that has two read ports and one write port (corresponding to the two inputs and one output of the execution unit). When a first load instruction is executed, data is read from a cache line, for example, and written to the dedicated RF using the sole write port. While the write port is being used to write the data to the dedicated RF by the first load instruction, no other instruction or operation may use the write port for the dedicated RF until the first instruction is finished writing data to the dedicated RF using the write port. In other words, only one operation/instruction may use a port at a time.

Furthermore, dependent instructions of the load instruction may remain stalled until this re-execution is complete, which would also result in exposing significant latency for the re-executed load instruction. Accordingly, there is a recognized need for reducing the aforementioned costs associated with load instruction re-execution.

SUMMARY

Exemplary aspects of the invention are directed to systems and methods for reusing load instructions by a processor without accessing a data cache. A load store execution unit (LSU) of the processor is configured to determine if a prior execution of a first load instruction loaded data from a first cache line of the data cache and determine if a current execution of the second load instruction will load the data from the first cache line of the data cache. Further, the LSU also determines if a reuse of the data from the prior execution of the first load instruction for the current execution of the second load instruction will lead to functional errors. If there are no functional errors, the data from the prior execution of the first load instruction is reused for the current execution of the second load instruction, without accessing the data cache for the current execution of the second load instruction.

An exemplary aspect is directed to a method of executing load instructions in a processor. The method comprises determining if a current execution of a second load instruction will load data from a first cache line of a data cache, wherein a prior execution of a first load instruction loaded the data from the first cache line of the data cache, and determining if reusing the data from the prior execution of the first load instruction for the current execution of the second load instruction will lead to functional errors. If there are no functional errors, then the data from the prior execution of the first load instruction is reused for the current execution of the second load instruction without accessing the data cache for the current execution of the second load instruction.

Another exemplary aspect is directed to an apparatus comprising a processor configured to execute instructions, a data cache configured to store data and accessible by the processor, and a load store execution unit (LSU) of the processor. The LSU is configured to determine if a current execution of a second load instruction will load data from a first cache line of a data cache, wherein a prior execution of a first load instruction loaded the data from the first cache line of the data cache, determine if a reuse of the data from the prior execution of the first load instruction for the current execution of the second load instruction will lead to functional errors, and if there are no functional errors, reuse the data from the prior execution of the first load instruction for the current execution of the second load instruction without accessing the data cache for the current execution of the second load instruction.

Yet another exemplary aspect is directed to an apparatus comprising means for determining if a current execution of a second load instruction will load data from a first cache line of a data cache, wherein a prior execution of a first load instruction loaded the data from the first cache line of the data cache, means for determining if reusing the data from the prior execution of the first load instruction for the current execution of the second load instruction will lead to functional errors, and means for reusing the data from the prior execution of the first load instruction for the current execution of the second load instruction without accessing the data cache for the current execution of the second load instruction if there are no functional errors.

Another exemplary aspect is directed to a non-transitory computer-readable storage medium comprising code, which, when executed by a computer, causes the computer to perform operations for reusing load instructions in a processor. The non-transitory computer-readable storage medium comprises code for determining if a current execution of a second load instruction will load data from a first cache line of a data cache, wherein a prior execution of a first load instruction loaded the data from the first cache line of the data cache, code for determining if reusing the data from the prior execution of the first load instruction for the current execution of the second load instruction will lead to functional errors, and code for reusing the data from the prior execution of the first load instruction for the current execution of the second load instruction without accessing the data cache for the current execution of the second load instruction if there are no functional errors.

BRIEF DESCRIPTION OF THE DRAWINGS

The accompanying drawings are presented to aid in the description of aspects of the invention and are provided solely for illustration of the aspects and not limitation thereof.

FIG. 4 illustrates a reuse load queue, according to aspects of this disclosure.

DETAILED DESCRIPTION

Figure 1:
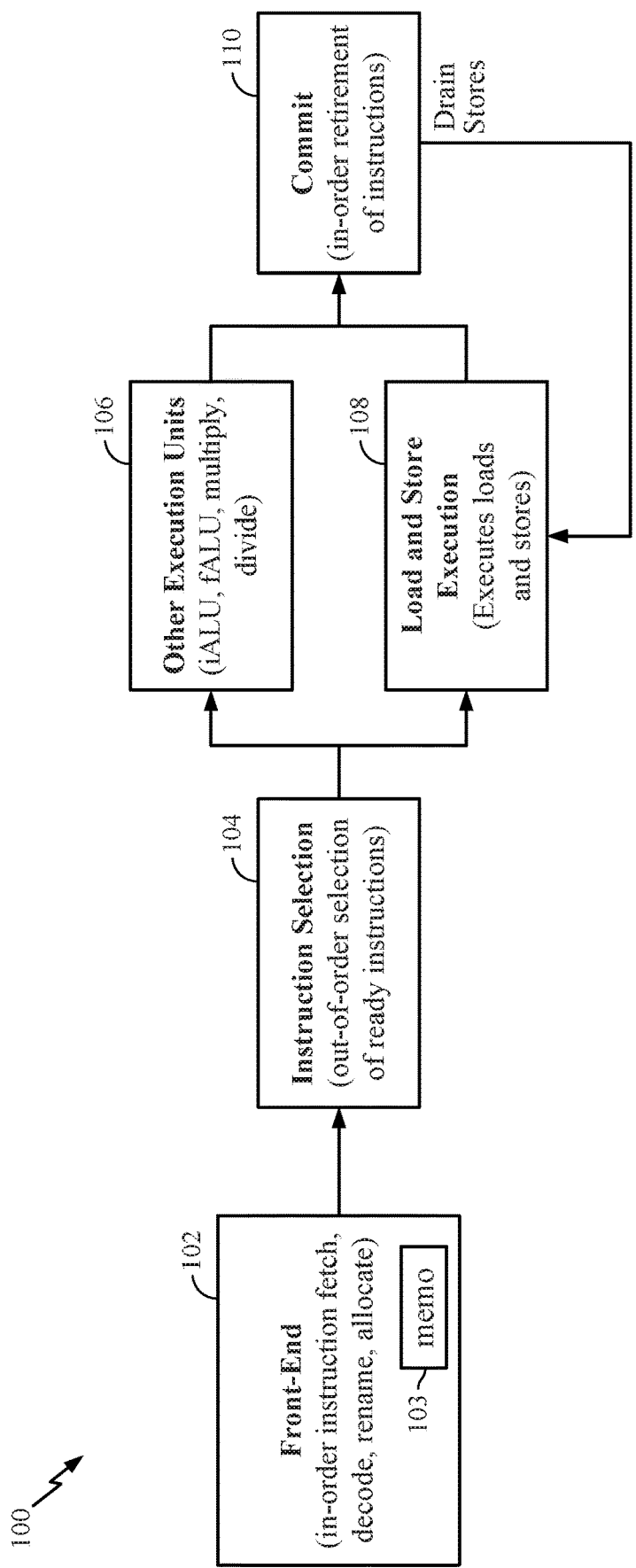
FIG. 1 illustrates an exemplary processor according to aspects of this disclosure.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to reducing data cache accesses for load instructions, thus correspondingly also reducing exposed load latencies (both for the load instructions and dependent instructions thereof), while also maintaining functional correctness. Specifically, exemplary aspects relate to reducing the costs for re-executing a load instruction whose address did not change, and wherein during a previous execution, the load instruction obtained its data from the data cache (for example in cases wherein there is no load-after-store dependence). If there are no changes to a cache line in the data cache which is accessed by the previously executed load instruction, then the re-executed load instruction may be reused in exemplary aspects, without accessing the data cache. Exemplary aspects herein are directed to techniques for detecting when a load instruction may be reused, as well as systems and methods for ensuring functional correctness when such reuse may take place.

With reference to FIG. 1, an instruction execution pipeline of an example processor 100 according to aspects of this disclosure is illustrated. While functional blocks are shown in FIG. 1, it will be understood that implementation of these functional blocks may vary without affecting the scope of this disclosure. As shown, front-end 102 includes the functionality for fetching instructions in program order (or "in-order"), decoding the instructions, performing any renaming (e.g., register renaming, as known in the art), and allocating the instructions for execution (e.g., in execution units such as 106, 108, etc. which will be discussed further below). Front-end 102 may also include a memoization structure such as memo 103, which will be explained in further detail in the following sections. Briefly, memo 103 may be able to predict the outcome of load instructions to enable dependents thereof to be executed early, or before the dependents are provided to instruction selection unit 104, which will be described next.

Instruction selection unit 104 is a functional block for selecting instructions which are ready for execution (e.g., whose operands are available), wherein this selection may involve selecting instructions out of program order (or "out-of-order") to be scheduled for execution. Instruction selection unit 104 may also be referred to as an instruction scheduler.

Block 106 comprises execution units such as one or more arithmetic logical units (ALUs), with an instruction ALU (iALU) and a floating point ALU (fALU) illustrated; various multiply/divide blocks, etc. Load and store execution unit (LSU) 108 is separately shown to include an associated execution pipeline for load/store execution. Commit block 110 shows functionality related to committing or retiring instructions which have completed execution, and this is typically in-order. From commit block 110, store instructions which have completed execution may be drained back into LSU 108 to update load store queues therein, as will be further explained with reference to exemplary aspects of this disclosure. Draining a store instruction involves updating the LSU 108 with the state of a store instruction. For example, if a store instruction for cache line A was committed in commit block 110, then LSU 108 may be updated that the cache line A now has the data for the committed store instruction so that a subsequent load instruction for cache line A will or will not be executed with the new data in cache line A. In other words, the committed store instruction may be "drained" back to the LSU 108 to update the LSU 108 load store queues.

Figure 2:
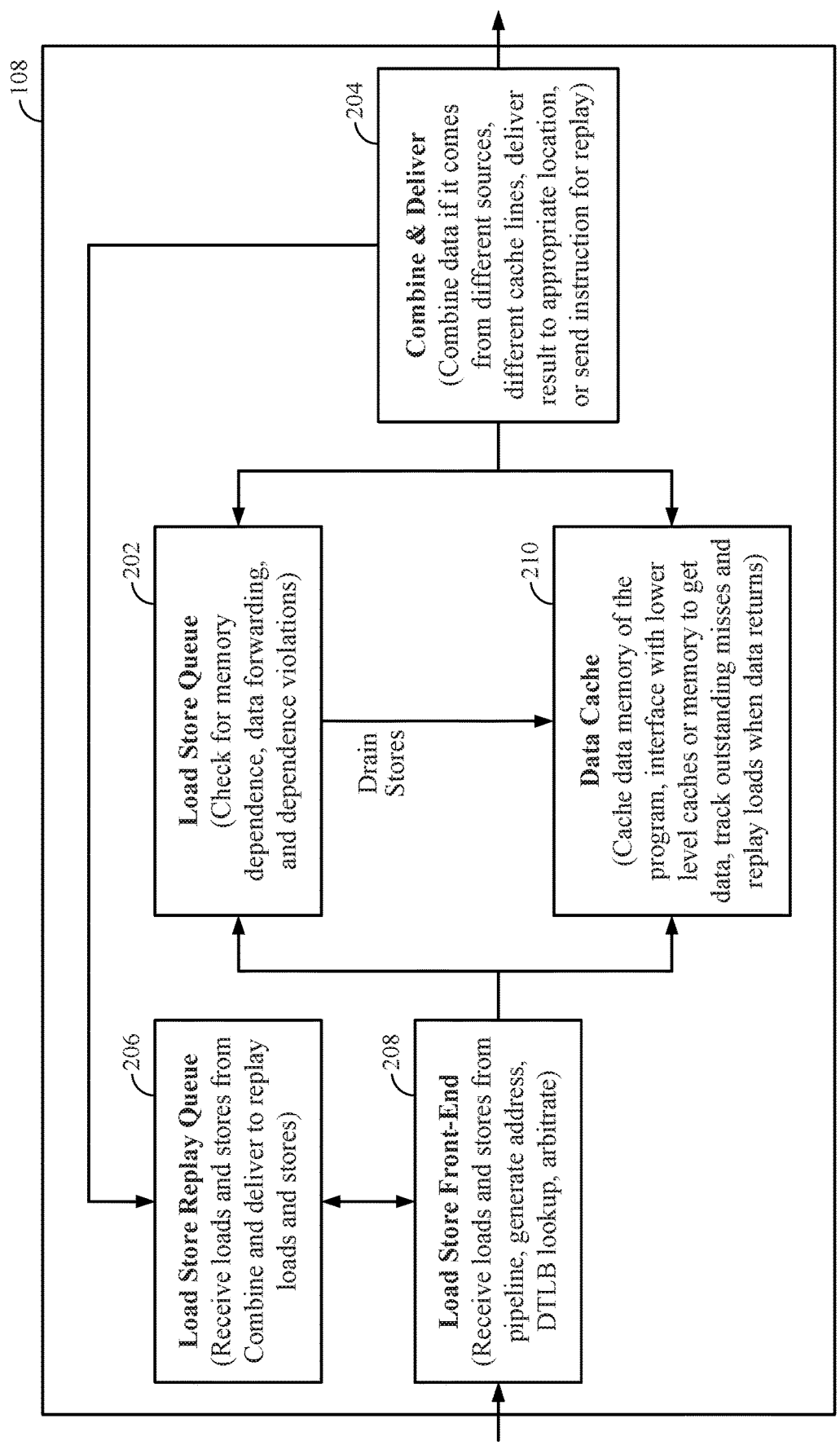
FIG. 2 illustrates a load store execution unit of a processor, according to aspects of this disclosure.

FIG. 2 illustrates a detailed view of LSU 108 according to this disclosure. As shown. LSU 108 may include various functional blocks, described as follows. Load store queue (LSQ) 202 is configured to maintain correct memory ordering and prevent one or more types of data hazards, which will be explained further below. LSQ 202 may hold information about the load and store instructions that have been dispatched by an instruction scheduler such as instruction selection unit 104 of FIG. 1. LSQ 202 may be configured to check for memory dependencies, provide data forwarding (e.g., from a store to a load instruction requesting the same data), check for dependence violations, etc. Although a unified structure for loads and stores in LSQ 202 is described herein, it will be recognized that in some aspects, a disjoint structure such as a separate load queue and a store queue may also be used.

Figure 3:
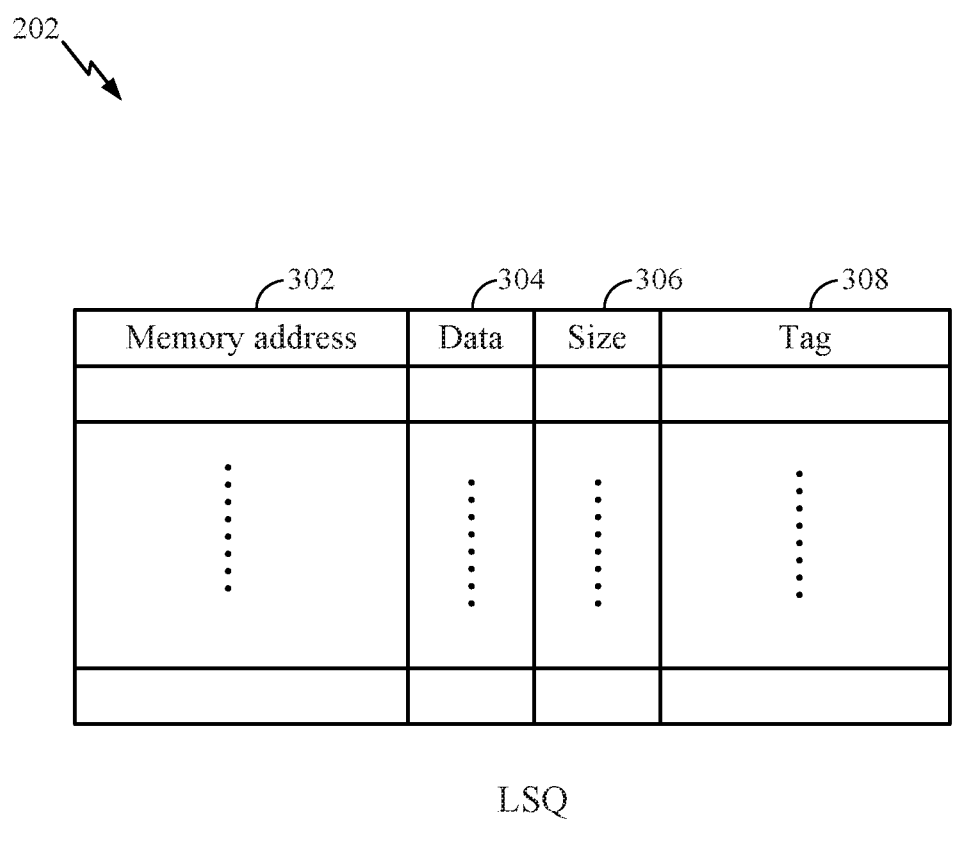
FIG. 3 illustrates a load store queue of a load store execution unit, according to aspects of this disclosure.

An exemplary implementation of LSQ 202 is shown in FIG. 3. Briefly departing from the description of FIG. 2 and focusing on FIG. 3, LSQ 202 has been shown to include one or more entries, with each entry comprising fields such as memory address 302, data 304, size 306, and tag 308, keeping in mind that various other fields may also be present, even if not exhaustively described herein. For load and store instructions executed by LSU 108, the entries of LSQ 202 may include the information needed for proper execution of the each load and store instruction, such as memory address 302 that may include the memory address for the load/store instructions, tag 308 that may be used to identify the position of the respective instruction in program order, data 304 that may include the respective load or store data, and size 306 that may be a field used for describing the size of data 304 (e.g., the size the data may occupy within one or more cache lines of data cache 210, discussed further with reference to FIG. 2 below).

Returning to FIG. 2, from LSQ 202, store instructions may be drained to data cache 210. Data cache 210 may be a level 1 (L1) cache or a level 2 (L2) cache for example, and may store data for use by a requesting processor such as processor 100. More generally, data cache 210 may cache data of programs executing on one or more processors, interface with one or more lower levels of caches (e.g., backing caches such as L2, L3, etc.), memory, etc., track outstanding cache misses, replay load instructions when data which missed in data cache 210 returns from the lower levels of caches or memory.

From LSQ 202, data may also be provided to combine and deliver unit 204, wherein data from different sources, different cache lines, etc., may be combined and from thereon, the resultant combined data may be directed to a different unit or sent for replaying an instruction as needed, e.g., to load store replay queue 206.

Load store replay queue 206 may receive the combined data from combine and deliver unit 204, queue the combined data to manage traffic, and deliver the combined data to replay load and store instructions when they are ready to accept this data.

Load store front end unit 208 may interact with load store replay queue 206, and may receive load and store instructions from the instruction pipeline of processor 100 or from load store replay queue 206, and perform arbitration between multiple outstanding load/store instructions. The load store front end unit 208 may also generate addresses for memory management unit (MMU) or a data translation lookaside buffer (DTLB) (i.e., a DTLB for translating between virtual and physical addresses) for lookup.

For load instructions which satisfy criteria for reuse which will be discussed in the following sections, a memoization structure may be provided to facilitate reuse of the load instruction without incurring an access to data cache 210. An exemplary memoization structure such as memo 103 may be present in front-end 102 of processor 100 (see FIG. 1). Memo 103 may be used to predict the outcome of load instructions, e.g., to enable dependent instructions of a load instruction to be executed (e.g., out-of-order) before the completion of the load instruction's execution. For instance, memo 103 may be configured to predict the outcome of the load instruction before the dependent instructions of the load instruction enter instruction selection unit 104 or other scheduler logic.

While a more detailed implementation of memo 103 is beyond the scope of this disclosure, a memoization structure such as memo 103 may be configured to provide information to determine whether a load instruction may be reused or if data cache 210 is to be accessed to service the load instruction. The contents of memo 103 may be implementation specific, but generally may include logic configured to inform the load instruction about its reuse potential before the load instruction attempts to access data cache 210.

For all load/store instructions, including the potentially reusable load instructions, LSQ 202 may be configured to resolve the following data hazards which may arise due to out-of-order execution and memory ordering techniques.

A read-after-write (RAW) hazard may arise when a younger (in program order) load instruction executes earlier than an older store instruction to the same address, which results in the load instruction getting stale data from data cache 210, for example. For resolving RAW hazards, several techniques may be employed by LSQ 202.

In one example, LSQ 202 may support a store probe, wherein the execution of a load instruction may include a check in LSQ 202 for any older store instructions to same memory address 302 as the load instruction. If such an older store instruction is present in an entry with a matching memory address 302 as the load instruction, then LSQ 202 may be configured to provide the load instruction with data 304 from the youngest older store instruction's entry in LSQ 202.

In another example, LSQ 202 may support a memory disambiguation technique wherein, if an unresolved older store instruction (i.e., a store instruction whose store address is not known yet) exists in the pipeline, then the load instruction may either wait for the store address to be available, or speculate that the store instruction will not be to the same address, and based on this, the load instruction may be executed using values from data cache 210.

In yet another example, LSQ 202 may support a load probe when an older store instruction executes, wherein the older store instruction's execution may include a check in LSQ 202 for any younger load instructions that should have waited, and if found, the older store instruction may initiate a process to re-execute the load instruction.

A write-after-read (WAR) hazard may arise when a younger store instruction executes earlier than an older load instruction to the same address and the younger store instruction overwrites data cache 210, for example, before the older load instruction reads the correct data. To avoid WAR hazards, all store instructions may be caused to wait in LSQ 202 until they are committed, before updating data cache 210 with new values. A combined WAR and RAW hazard prevention mechanism may be employed as above in LSQ 202 to guarantee functional correctness and avoid these data hazards.

A write-after-write (WAW) hazard may arise when a younger store instruction executes earlier than an older store instruction to the same address, resulting in data cache 210 having a stale value (produced by the older store instruction, instead of the younger store instruction). Thus, to prevent a WAW hazard, all committed store instructions in LSQ 202 may be allowed to update data cache 210 in program order, to ensure coherent and consistent memory.

A read-after-read (RAR) hazard may arise when a younger load instruction executes earlier than an older load instruction, and external agents (e.g., processors other than processor 100 or other cores, for example) change the data before the older load instruction executes. This can cause the younger load instruction to have an older value and the older load instruction to have a newer value. A RAR hazard may be problematic in some processing systems, e.g., strictly memory ordered systems. Like the RAW hazard's load probe, by using store instructions discussed above, load instructions may also check LSQ 202 to see if there are any younger load instructions to the same address, and if present, initiate processes to re-execute the younger load instruction.

Keeping the above potential hazards in mind, RAW and RAR hazards are seen to be particularly relevant when considering the re-execution of load instructions in exemplary aspects. In exemplary aspects herein, a load instruction may be re-executed without accessing data cache 210 when there are no potential RAW or RAR hazards.

The following criteria describe when a current load instruction may be reused in a processing system. The term "reuse" herein refers to re-execution of the current load instruction without incurring an access to data cache 210. When reused in this manner, the current load instruction may be executed without exposing the full latency of the load instruction and any dependent instructions thereof. In some cases, reusing a load instruction may also mean that if the data or load value of the load instruction was speculated by a speculation technique, then the re-execution of load instruction confirms this speculated load value. In the following description of the exemplary criteria for reuse of a load instruction, the terms "current load instruction" and "prior load instruction" refer, respectively, to the current execution (or re-execution) of a load instruction, and a prior, first-time, or initial execution of the same load instruction.

Accordingly, in one exemplary aspect, LSQ 202 may be configured to support checks for the following criteria:
  (a) the memory address from which data is to be loaded from (or load address) remains the same for the current load instruction and the prior load instruction (or a prior or initial run of the same load instruction);
  (b) the data for the prior load instruction's execution was obtained from the data cache;
  (c) the cache line at the load address storing the data was not written to by any store instruction;
  (d) the cache line was not evicted since the prior load instruction's execution, and
  (e) there is no conflicting store instruction in a store queue such as LSQ 202 for the current load instruction.

In this disclosure, reuse-prediction for a load instruction refers to determining whether criteria (a)-(e) are satisfied. Reuse-prediction logic may be employed to determine whether the above criteria are satisfied for particular implementations of processor 100. The reuse of data for such load instructions for which the above criteria are satisfied may involve obtaining the data from a structure such as memo 103, without accessing data cache 210. In this disclosure, satisfying criteria (a)-(e) also guarantees functional correctness for a load instruction which has been reused.

Figure 5:
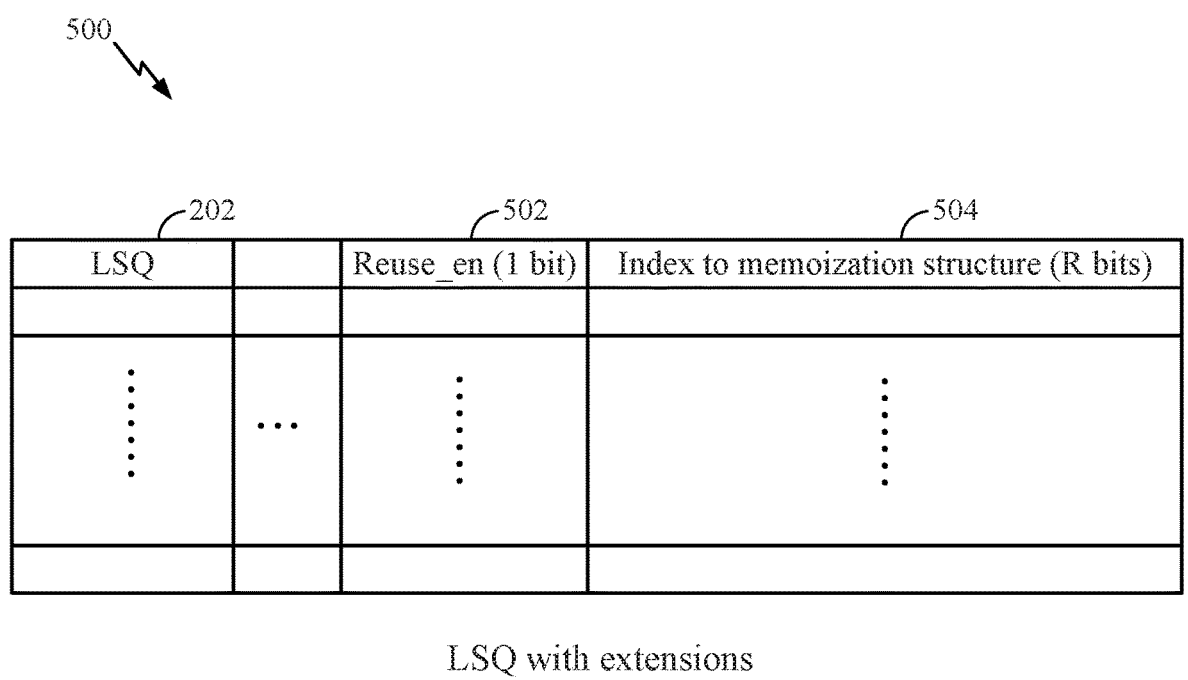
FIG. 5 illustrates a load store queue with extension fields for reusing load instructions, according to aspects of this disclosure.

Specifically in one aspect, if criteria (a) and (b) above are satisfied, i.e., a load instruction which had previously obtained data from data cache 210 has come up again for current execution with the same address from which to load data from, then the following structures in FIGS. 4-5 may be used to ascertain functional correctness of reusing the data (e.g., from memo 103) for the current execution of the second load instruction. Specifically, functional correctness checked based on determining whether the cache line storing the data was written to by an intervening store instruction or the cache line storing the data was evicted from data cache 210 in the intervening time period after the previous load instruction had obtained the data. The above checks will reveal if the cache line of data cache 210 which contains the data for the current load instruction, may have been changed since the cache line's last observed value by the prior load instruction. It is noted that this change may have been due to an intervening access by processor 100 or from a different processor or core in a multiprocessing environment in which processor 100 and the different processor or core may share access to the load address. Such a change would negatively affect the functional correctness of reusing the current load instruction.

With reference to FIG. 4, an exemplary apparatus related to determining functional correctness for the reuse of the current load instruction will be described. FIG. 4 shows reuse load queue (RLQ) 400 with one or more entries. Each entry of RLQ 400 includes at least the fields identified as load identifier 402, cache line tag 404, unaligned bit 406, and valid bit 408. RLQ 400 is configured to hold information for a load instruction that has been identified for being reused (without accessing data cache 210). A load instruction which has been identified for reuse is added to RLQ 400. RLQ 400 is configured to observe the effects of reusing the load instruction to ensure functional correctness. If an evicted cache line may negatively affect the functional correctness of the reuse of a load instruction whose address is registered in an entry of RLQ 400, then the entry (and any other entries which may be affected, as outlined below) are invalidated. Invalidation of the entry would cause the reuse effort to be terminated, and the load instruction would be executed as usual, with an access to data cache 210. However, in situations wherein there is no such invalidation, reuse of the load instruction may proceed without accessing data cache 210, reaping the above-noted benefits of such reuse.

In more detail, load identifier 402 may be a multi-bit field (e.g., M-bits) and may include the address (or portion thereof) of the load instruction. Load identifier 402 may be used to lookup an entry of RLQ 400 to determine reusability. If the address of the current load instruction matches load identifier 402 in an entry of RLQ 400, then it is determined whether valid bit 408 (e.g., a 1-bit field which specifies whether the entry is valid or not) is true/valid. If valid bit 408 indicates that the entry is valid, then the load instruction may be reused, i.e., re-executed without accessing data cache 210.

If a cache line in data cache 210 is evicted, then cache line tag 404 (e.g., an N-bit field containing the cache line address or portion thereof) and unaligned bit 406 (e.g., a 1-bit field) are used to check if there is a matching entry in RLQ 400 for the evicted cache line (e.g., if the evicted cache line's address matches corresponding bits of cache line tag 404), and if found, then valid bit 408 for this entry is cleared. Unaligned bit 406 is set for load instructions that cross the cache line boundary and are dependent on two sequential cache line addresses. If unaligned bit 406 is set for an entry, then the evicted cache line is checked against cache line tag 404 that will span two subsequent cache lines. If the evicted cache line matches either of these cache lines, valid 408 for that entry is cleared (i.e., the entry is invalidated). In this manner, one or more entries of RLQ 400 may be invalidated to ensure functional correctness while reusing load instructions according to this disclosure.

Additionally, execution of all store instructions by processor 100 may also include checking RLQ 400 to see if their addresses match load identifier 402 of any entry of RLQ 400. If a matching entry is found, then the matching entry is invalidated. In this manner, any store instruction which overlaps with the reused load instruction may be prevented from incurring a functional error or data hazard.

Referring now to FIG. 5, another exemplary aspect for reusing load instructions is illustrated. In this case, all load instructions are treated as though they be will be reused. FIG. 5 shows LSQ 500, which may include an augmented implementation of LSQ 202, for example, with additional fields or extensions as discussed below.

As shown, LSQ 500 includes one or more entries, with entries of LSQ 202 as discussed with reference to FIG. 3 (without being repeated here) and extension fields such as reuse_en bit 502 (e.g., a 1-bit field), and index to memoization structure 504. Memory address 302 and size 306 of LSQ 202 (see FIG. 3) may be used for identifying whether a cache line evicted from data cache 210 may affect a corresponding load instruction in the entry of LSQ 500.

As shown in FIG. 5, LSQ 500 may be checked upon eviction of a cache line from data cache 210 to see if memory address 302 is present in LSQ 202. If there is a matching entry with memory address 302 being the same as that of the evicted cache line, then reuse_en 502 may be de-asserted. Reuse_en 502 may be a 1-bit field, which, when set or asserted, may allow a load instruction (which matches the above-noted criteria (a)-(e) for reuse) to be reused; and when de-asserted, the load instruction may be prevented from being reused. Thus, if the load instruction has a matching address with an evicted cache line, then the load instruction is prevented from being reused without a data cache 210 access, to ensure functional correctness. In this instance, the load instruction may be re-executed, incurring access to data cache 210 and other associated costs. To prevent such reuse, reuse_en 502 may be de-asserted, and using the corresponding index to memoization structure 504 (e.g., an R-bits field), memo 103 may be accessed and updated to reflect that the load instruction may not be reused.

A load probe by a store instruction as explained above for determining RAW hazards, may also update LSQ 500 if it is discovered from LSQ 500 (specifically LSQ 202) that a younger load instruction should have waited but was executed ahead of the store instruction. In this situation as well, reuse_en 502 may be reset/de-asserted for the entry of LSQ 500 comprising the younger load instruction. This would mean that a later load instruction may not reuse the data from the younger load instruction if such data is available in memo 103, for example. Similar to the above example, the memoization structure 504 may be updated in this case to inform any re-executing loads that it is no longer possible to reuse the load instruction by avoiding an access to data cache 210.

Figure 6:
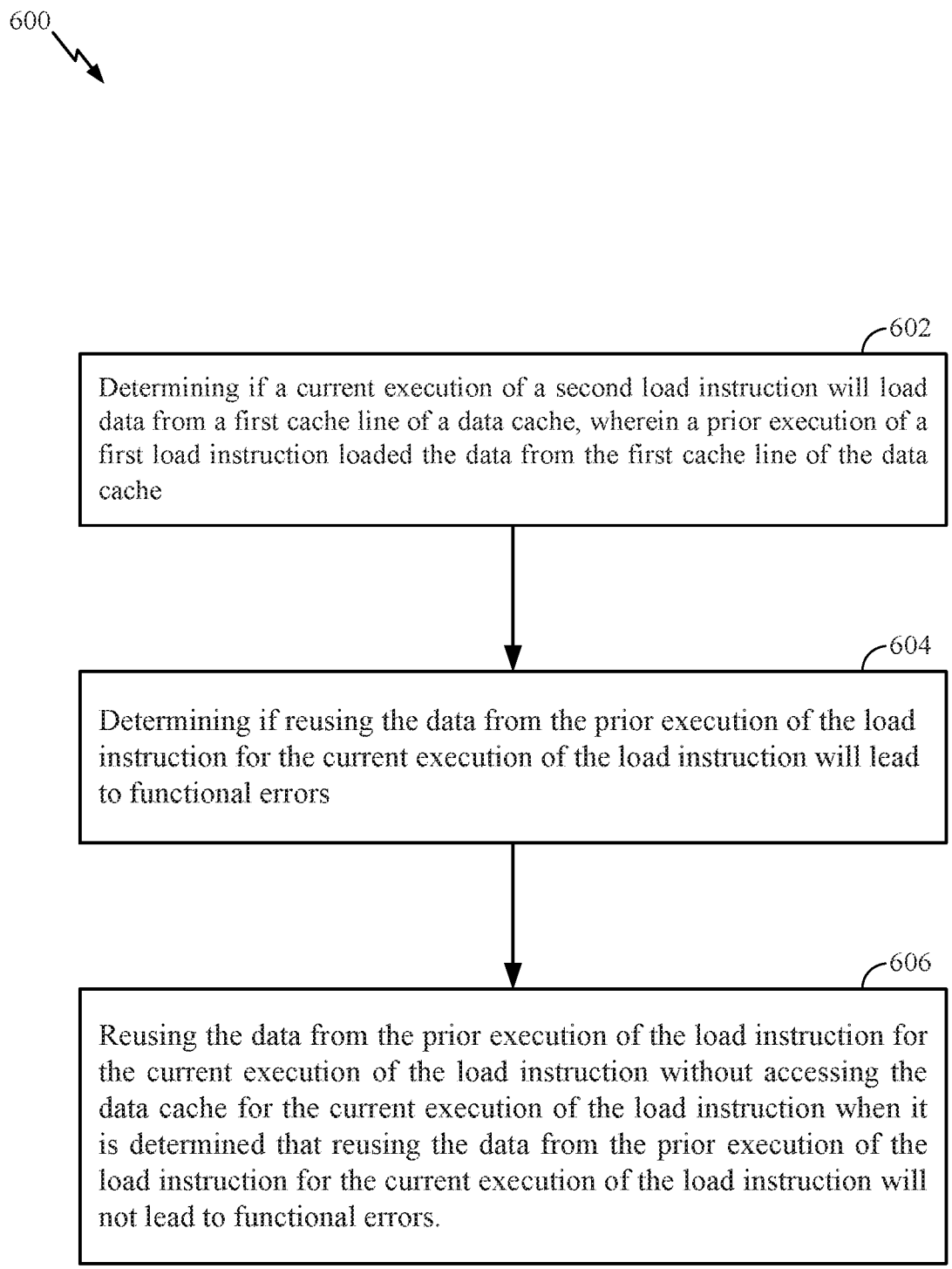
FIG. 6 illustrates a method of reusing a load instruction, according to aspects of this disclosure.

Accordingly, it will be appreciated that exemplary aspects include various methods for performing the processes, functions and/or algorithms disclosed herein. For example, FIG. 6 (with combined references below to FIGS. 2-5) illustrates a method 600 of executing load instructions in a processor (e.g., processor 100).

Block 602 comprises determining if a current execution of a second load instruction will load data from a first cache line of a data cache, wherein a prior execution of a first load instruction loaded the data from the first cache line of the data cache. For example, by checking LSQ 202 if there is a matching tag 308 and memory address 302 in LSQ 202 for the current execution, which would indicate that there was a previous execution of the load instruction for the same memory address.

Block 604 comprises determining if reusing the data from the prior execution of the first load instruction for the current execution of the second load instruction will lead to functional errors (e.g., by determining whether RLQ 400 shows an invalid indication in valid 408 for the load instruction's load identifier 402, or LSQ 500 has reuse_en 502 de-asserted for an entry corresponding to the load instruction).

In Block 606, if there are no functional errors, then the data from the prior execution of the first load instruction is reused for the current execution of the second load instruction (e.g., from memo 103) without accessing the data cache for the current execution of the second load instruction.

Figure 7:
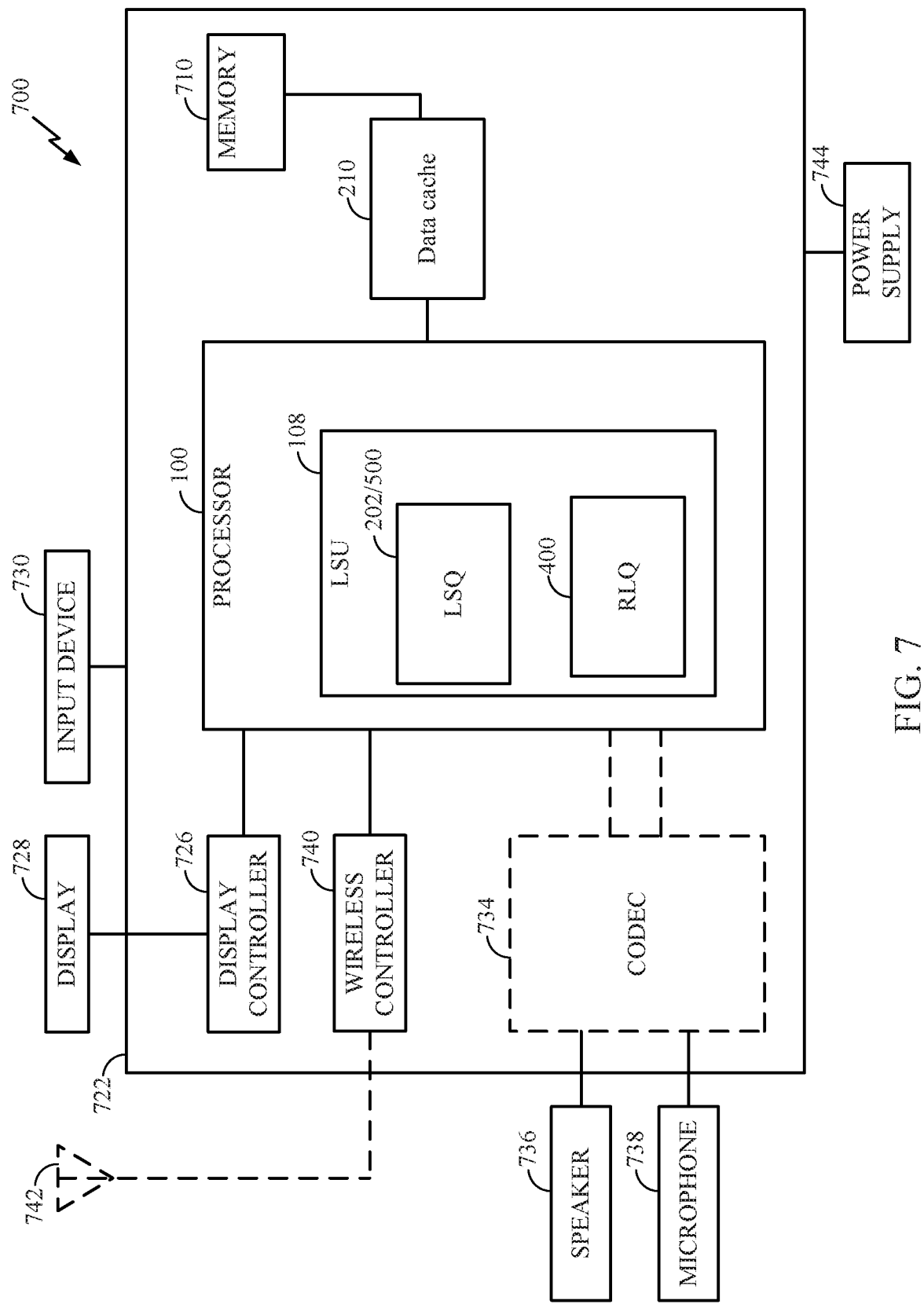
FIG. 7 depicts an exemplary computing device in which an aspect of the disclosure may be advantageously employed.

An exemplary apparatus, in which exemplary aspects of this disclosure may be utilized, will now be discussed in relation to FIG. 7. FIG. 7 shows a block diagram of computing device 700. Computing device 700 may correspond to an exemplary implementation of a processing system comprising processor 100 discussed previously, in communication with data cache 210. While other intermediary caches may be present, a backing storage such as memory 710 has been identified as being in communication with data cache 210, and more generally in communication with processor 100. In processor 100, some of the details shown in previous figures have been omitted for the sake of clarity, but LSU 108 comprises at least one of LSQ 202 with extensions such as LSQ 500 or RLQ 400 being present.

FIG. 7 also shows display controller 726 that is coupled to processor 100 and to display 728. In some cases, computing device 700 may be used for wireless communication and FIG. 7 also shows optional blocks in dashed lines, such as coder/decoder (CODEC) 734 (e.g., an audio and/or voice CODEC) coupled to processor 100 and speaker 736 and microphone 738 can be coupled to CODEC 734; and wireless antenna 742 coupled to wireless controller 740 which is coupled to processor 100. Where one or more of these optional blocks are present, in a particular aspect, processor 100, display controller 726, memory 710, and wireless controller 740 are included in a system-in-package or system-on-chip device 722.

According to a particular aspect, input device 730 and power supply 744 are coupled to system-on-chip device 722. Moreover, in a particular aspect, as illustrated in FIG. 7, where one or more optional blocks are present, display 728, input device 730, speaker 736, microphone 738, wireless antenna 742, and power supply 744 are external to system-on-chip device 722. However, each of display 728, input device 730, speaker 736, microphone 738, wireless antenna 742, and power supply 744 can be coupled to a component of system-on-chip device 722, such as an interface or a controller.

It should be noted that although FIG. 7 generally depicts a computing device, processor 100 and memory 710, may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for reusing load instructions without accessing a data cache. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of executing load instructions in a processor, the method comprising:
   determining if a current execution of a second load instruction will load data from a first cache line of a data cache, wherein a prior execution of a first load instruction loaded the data from the first cache line of the data cache;
   determining, using a load store queue (LSQ), if reusing the data from the prior execution of the first load instruction for the current execution of the second load instruction will lead to functional errors and if an older store instruction for the first cache line is present in the LSQ, wherein the determining comprises one of:
      accessing a reuse load queue (RLQ) for the current execution of the second load instruction to determine if the RLQ comprises a valid entry corresponding to the load instruction; and
      accessing the load store queue (LSQ) for the current execution of the second load instruction to determine if the LSQ comprises a reuse indication for an entry corresponding to the load instruction; and
   reusing the data from the prior execution of the first load instruction for the current execution of the second load instruction without accessing the data cache for the current execution of the second load instruction when it is determined that reusing the data from the prior execution of the first load instruction for the current execution of the second load instruction will not lead to functional errors and no older store instruction for the first cache line is present in the LSQ.

2. The method of claim 1, wherein the RLQ comprises one or more entries for load instructions that have been identified for reusing data without accessing the data cache, and wherein:
   one or more entries of the RLQ are invalidated if data in corresponding one or more cache lines of the data cache are evicted; or
   one or more store instructions have addresses matching addresses of the load instructions in the RLQ.

3. The method of claim 2, comprising invalidating entries corresponding to an evicted cache line and a subsequent cache line in the RLQ if an unaligned bit corresponding to an entry for the evicted cache line is set in the RLQ.

4. The method of claim 1, wherein the LSQ comprises one or more entries, having the reuse indication for an entry—is cleared if a cache line corresponding to the entry is evicted from the data cache.

5. An apparatus comprising:
a processor configured to execute instructions;
a data cache configured to store data and accessible by the processor;
a load store execution unit (LSU) of the processor configured to:
determine if a current execution of a second load instruction will load data from a first cache line of a data cache, wherein a prior execution of a first load instruction loaded the data from the first cache line of the data cache;
determine, using a load store queue (LSQ), if a reuse of the data from the prior execution of the first load instruction for the current execution of the second load instruction will lead to functional errors and if an older store instruction for the first cache line is present in the LSQ; and
reuse the data from the prior execution of the first load instruction for the current execution of the second load instruction without accessing the data cache for the current execution of the second load instruction when it is determined that reusing the data from the prior execution of the first load instruction for the current execution of the second load instruction will not lead to functional errors and no older store instruction for the first cache line is present in the LSQ, wherein the LSU comprises one of:
a reuse load queue (RLQ) configured to determine if the reuse of the data from the prior execution of the first load instruction for the current execution of the second load instruction will lead to functional errors;
the load store queue (LSQ), the LSQ configured to determine if the reuse of the data from the prior execution of the first load instruction for the current execution of the second load instruction will lead to functional errors, wherein the LSQ comprises one or more entries, with each entry comprising a reuse indication.

6. The apparatus of claim 5, wherein the LSU comprises the reuse load queue (RLQ) configured to determine if the reuse of the data from the prior execution of the first load instruction for the current execution of the second load instruction will lead to functional errors, wherein the RLQ comprises one or more entries for load instructions which have been identified for reusing data without accessing the data cache, and wherein the RLQ is configured to:
invalidate one or more entries if data in corresponding one or more cache lines of the data cache are evicted; or
invalidate one or more entries if one or more store instructions have addresses matching addresses of the load instructions in the RLQ.

7. The apparatus of claim 6, wherein the RLQ is configured to invalidate entries corresponding to an evicted cache line and a subsequent cache line if an unaligned bit corresponding to an entry for the evicted cache line is set in the RLQ.

8. The apparatus of claim 5, wherein the LSU comprises the load store queue (LSQ), the LSQ configured to determine if the reuse of the data from the prior execution of the first load instruction for the current execution of the second load instruction will lead to functional errors, wherein the LSQ comprises one or more entries, with each entry comprising a reuse indication.

9. The apparatus of claim 8, wherein the reuse indication for an entry is cleared if a cache line corresponding to the entry is evicted from the data cache.

10. The apparatus of claim 9, wherein if the reuse indication for the entry is cleared, an index to a memoization structure in the entry is updated to indicate to the memoization structure that reuse of the load instruction is to be avoided.

11. An apparatus comprising:
means for determining if a current execution of a second load instruction will load data from a first cache line of a data cache, wherein a prior execution of a first load instruction loaded the data from the first cache line of the data cache;
means for determining, using a load store queue (LSQ), if reusing the data from the prior execution of the first load instruction for the current execution of the second load instruction will lead to functional errors and if an older store instruction for the first cache line is present in the LSQ;
means for storing one of:
one or more entries for load instructions which have been identified for reusing data without accessing the data cache; and
one or more entries, with a reuse indication for an entry being cleared if a cache line corresponding to the entry is evicted from the data cache; and
means for reusing the data from the prior execution of the first load instruction for the current execution of the second load instruction without accessing the data cache for the current execution of the second load instruction when it is determined that reusing the data from the prior execution of the first load instruction for the current execution of the second load instruction will not lead to functional errors and no older store instruction for the first cache line is present in the LSQ.

12. The apparatus of claim 11, comprising:
the means for storing one or more entries for load instructions which have been identified for reusing data without accessing the data cache, and wherein:
one or more entries of the means for storing are invalidated if data in corresponding one or more cache lines of the data cache are evicted; or
one or more store instructions have addresses matching addresses of the load instructions in the means for storing.

13. The apparatus of claim 12, comprising means for invalidating entries corresponding to an evicted cache line and a subsequent cache line in the means for storing if an unaligned bit corresponding to an entry for the evicted cache line is set in the means for storing.

14. The apparatus of claim 11, comprising:
the means for storing one or more entries, with a reuse indication for an entry being cleared if a cache line corresponding to the entry is evicted from the data cache.

15. A non-transitory computer-readable storage medium comprising code, which, when executed by a computer, causes the computer to perform operations for reusing load instructions in a processor, the non-transitory computer-readable storage medium comprising:
code for determining if a current execution of a second load instruction will load data from a first cache line of a data cache, wherein a prior execution of a first load instruction loaded the data from the first cache line of the data cache;

code for determining, using a load store queue (LSQ), if reusing the data from the prior execution of the first load instruction for the current execution of the second load instruction will lead to functional errors and if an older store instruction for the first cache line is present in the LSQ;

code for accessing:
- a reuse load queue (RLQ) for the current execution of the second load instruction to determine if the RLQ comprises a valid entry corresponding to the load instruction; and code for reusing the data from the prior execution of the first load instruction for the current execution of the second load instruction without accessing the data cache for the current execution of the second load instruction when it is determined that reusing the data from the prior execution of the first load instruction for the current execution of the second load instruction will not lead to functional errors and no older store instruction for the first cache line is present in the LSQ.

16. The non-transitory computer-readable storage medium of claim 15 comprising:
- the code for accessing the reuse load queue (RLQ) for the current execution of the second load instruction to determine if the RLQ comprises a valid entry corresponding to the load instruction,
- wherein the RLQ comprises one or more entries for load instructions which have been identified for reusing data without accessing the data cache, and wherein:
  - one or more entries of the RLQ are invalidated if data in corresponding one or more cache lines of the data cache are evicted; or
  - one or more store instructions have addresses matching addresses of the load instructions in the RLQ.

17. The non-transitory computer-readable storage medium of claim 16, comprising code for invalidating entries corresponding to an evicted cache line and a subsequent cache line in the RLQ if an unaligned bit corresponding to an entry for the evicted cache line is set in the RLQ.

* * * * *